(12) United States Patent
García Pérez

(10) Patent No.: US 11,307,435 B2
(45) Date of Patent: Apr. 19, 2022

(54) ENHANCED ARMLESS SPECTACLES

(71) Applicant: Jesus García Pérez, Barcelona (ES)

(72) Inventor: Jesus García Pérez, Barcelona (ES)

(*) Notice: Subject to any disclaimer, the term of this patent is extended or adjusted under 35 U.S.C. 154(b) by 136 days.

(21) Appl. No.: 16/500,950

(22) PCT Filed: Apr. 2, 2018

(86) PCT No.: PCT/EP2018/058380
§ 371 (c)(1),
(2) Date: Oct. 4, 2019

(87) PCT Pub. No.: WO2018/185041
PCT Pub. Date: Oct. 11, 2018

(65) Prior Publication Data
US 2020/0050016 A1    Feb. 13, 2020

(30) Foreign Application Priority Data

Apr. 5, 2017 (ES) ............................ ES201730610

(51) Int. Cl.
| | |
|---|---|
| G02C 5/12 | (2006.01) |
| G02C 3/00 | (2006.01) |
| G02C 5/00 | (2006.01) |
| B29D 12/02 | (2006.01) |
| G02C 5/06 | (2006.01) |
| G02C 5/08 | (2006.01) |

(52) U.S. Cl.
CPC ............. *G02C 5/128* (2013.01); *G02C 3/003* (2013.01); *G02C 5/006* (2013.01); *B29D 12/02* (2013.01); *G02C 5/06* (2013.01); *G02C 5/08* (2013.01)

(58) Field of Classification Search
CPC ........ G02C 5/128; G02C 3/003; G02C 5/006; G02C 5/06; G02C 5/08; B29D 12/02
See application file for complete search history.

(56) References Cited

U.S. PATENT DOCUMENTS

| | | |
|---|---|---|
| 5,015,087 A | 5/1991 | Baratelli |
| 1,914,971 A | 6/1993 | Ferris |
| 5,661,536 A | 8/1997 | Conway |

(Continued)

FOREIGN PATENT DOCUMENTS

| | | |
|---|---|---|
| DE | 10 2006 018 979 | 10/2007 |
| EP | 2 482 119 | 8/2012 |

(Continued)

*Primary Examiner* — Cara E Rakowski
(74) *Attorney, Agent, or Firm* — Finnegan, Henderson, Farabow, Garrett & Dunner LLP

(57) ABSTRACT

This invention refers to armless spectacles made from a sheet of material that includes at least a second folding line in stabilisation means. The invention proposes several methods of ensuring the second line and offering even greater rigidity. The spectacles can be converted from a non-functional state into a functional assembled state suitable for use by manipulating the configuration of at least one stabilising means in the bridge area. The spectacles have an enhanced rigidity thus increasing the overall stability of the spectacles during use. They can be presented basically flat for storage or transport and be easily manipulated to achieve the configuration for use. The spectacles may further present enhanced fastening and handling means that increase fastening stability as well as easy placement and removal of the spectacles on and from the nose, which further enhances reliability during use.

16 Claims, 10 Drawing Sheets

(56) References Cited

U.S. PATENT DOCUMENTS

| | | |
|---|---|---|
| 5,907,385 A | 5/1999 | Flores et al. |
| 8,491,117 B2 | 7/2013 | García Pérez |
| 2004/0256249 A1 | 12/2004 | Sarif |
| 2014/0192310 A1 | 7/2014 | Kim et al. |

FOREIGN PATENT DOCUMENTS

| | | |
|---|---|---|
| FR | 928 963 | 12/1947 |
| WO | WO 97/21397 | 6/1997 |
| WO | WO 2011/036324 | 3/2011 |

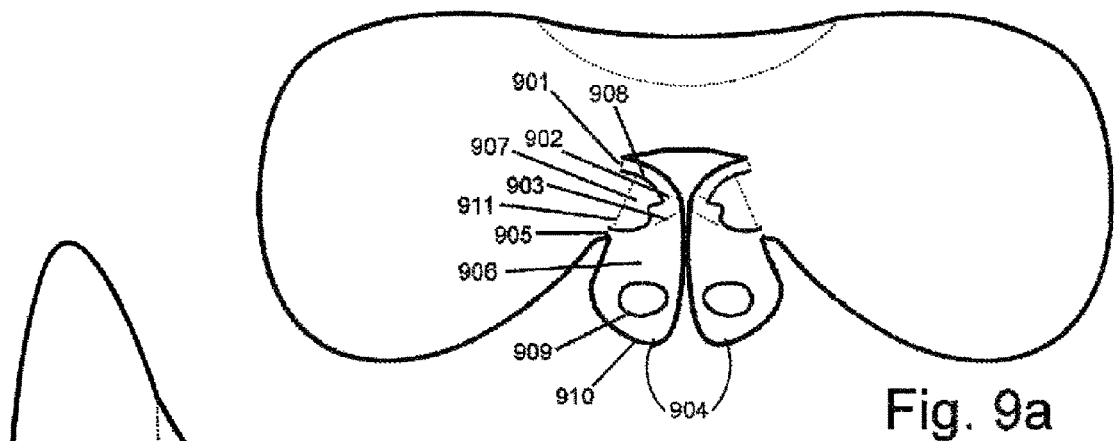
Fig. 9a
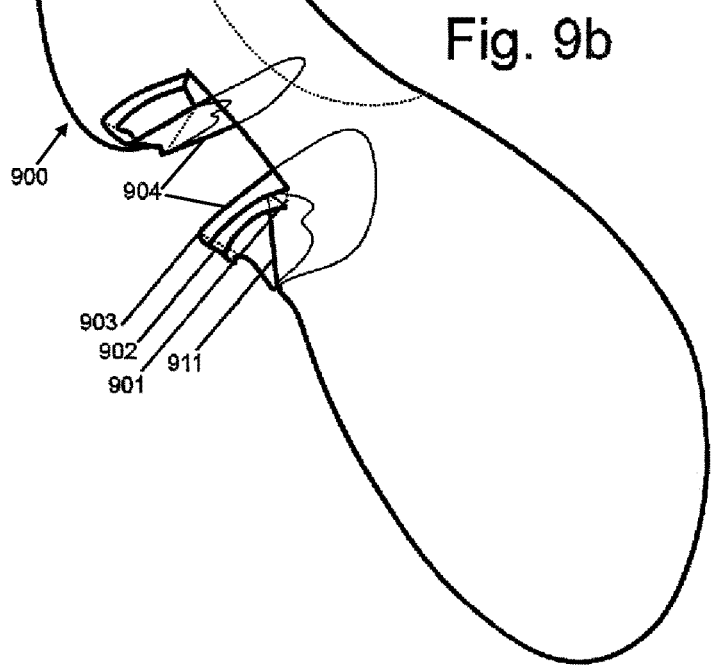
Fig. 9b
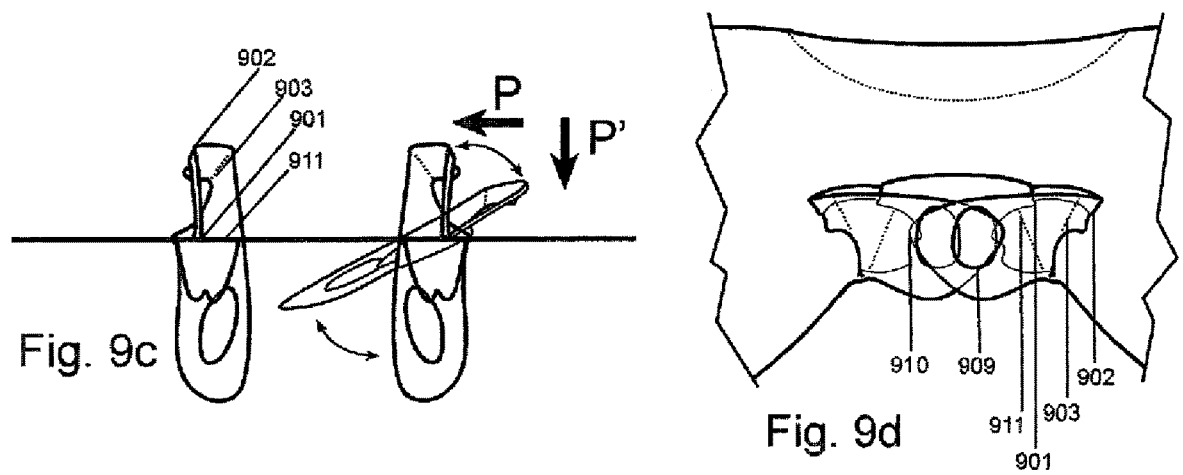
Fig. 9c
Fig. 9d

ENHANCED ARMLESS SPECTACLES

CROSS-REFERENCE TO RELATED APPLICATIONS

This application is a national stage application of International Application No. PCT/EP2018/058380, filed Apr. 2, 2018, and which is based upon and claims the benefit of priority from Spanish Patent Application No. P 201730610, filed Apr. 5, 2017, the entire contents of both of which are incorporated herein by reference.

FIELD OF THE INVENTION

This invention refers to enhanced spectacles without fastening arms. In particular, the invention refers to armless spectacles constructible from a single piece, of the type that are supported on the user's nose to which they are fastened by means of pads that tend to close in planes substantially perpendicular to the plane of optical properties, which may present greater rigidity, improved manageability and become substantially flat when not in use.

BACKGROUND

Spectacles without fastening arms are known in the prior art. Commonly, the constituent elements of the prior art spectacles have been manufactured from different materials. These elements are the optical areas, the frame, the bridge between the optical areas, and other. However, such manufacturing has the disadvantage of being complicated since the spectacles need to be assembled step by step joining the individual elements together.

Armless spectacles made from a single piece of material have been described in document PCT/2010/070609 by the same applicant. Since a single material is used, manufacturing is cheaper and simpler. However, they have the disadvantage that when undergoing sufficient force the sheet can bend perpendicularly with respect to the plane of optical properties deteriorating its characteristics.

FIG. 1 illustrates an example of spectacles 100 in the prior art. The spectacles 100 comprise two areas in front of the eyes that can have optical properties, the first area 101 and the second area 102. Areas 101 and 102, called optical areas, are joined by a bridge area 103 in an upper inner area of the spectacles. The spectacles further comprise, in a lower inner area of the optical areas 101, 102, fastening means 104, or pads, which serve to fasten the spectacles onto the user's nose. On the outer areas, near the user's temples, there are no fastening arms typically found on most glasses. As discussed above, these spectacles have limited rigidity that is subject to improvement.

On the other hand, the spectacles of the prior art make it difficult to put them in fundamentally flat or two-dimensional places such as inside a book or magazine or a wallet. However, precisely these places are highly suitable for certain applications or simply to comfortably carry the spectacles at any time.

Another problem for the stability and manageability of the spectacles made from a single piece of material are the fastening means, or pads, that fasten said spectacles to the user's nose. The proposed solutions in the prior art have as an important limitation the dimension that pads can reach because their larger surface would be to the detriment of the optical areas. In particular, the issue at stake is the extent of their length or the extent of their projection from the plane with optical properties without excessively affecting the surface of the optical areas. This limits the reliability and stability of the fastening of the nose pads, and thus of the spectacles, on the nose. Similarly, the surface dedicated to the means for handling the spectacles during placement for use would be limited.

Therefore, it is desirable to improve these spectacles in order to achieve greater stability and rigidity in the overall spectacle assembly, and that there is the possibility that the spectacles can be substantially flat during non-use and easy to assemble for use. In addition, to further improve the stability of the spectacles it is desirable that the nose pads thereof may be longer without affecting the optical areas and are provided with a comfortable solution for their handling, for example in the form of handling means whereby the user's fingers can clasp the spectacles more reliably when being placed and removed during use.

SUMMARY OF THE INVENTION

Some or all of the problems of the previously described prior art are solved by means of armless spectacles as proposed in the different embodiments of the invention. The invention is defined in the independent claims while the preferred embodiments are defined in the dependent claims.

The armless spectacles of the invention comprise at least one stabilising means that provides stability to the area in which it is integrated and provides the spectacles with an enhanced rigidity thus increasing the overall stability of the spectacles during use. Solutions are proposed so that they can be presented basically flat for storage or transport and be easily manipulated to achieve the configuration for use.

In one embodiment, the stabilising means is located in the bridge area. In another embodiment, the stabilising means is located in the fastening areas. In even another embodiment, the spectacles comprise a stabilising means in the bridge area and another stabilising means in the fastening means.

In one aspect, the at least one stabilising means comprises at least two folding lines, also known as folds, located consecutively in the transversal direction relative to the force vector they resist. The principle that explains the resistance of the stabilising means is that of the demultiplying of stresses. The first fold is necessary to configure the shape of the spectacles and maintains the shape by resisting the deformation stress as long as the surfaces that define it are not aligned again. At the end of the surface to be moved when applying the stress a second fold is provided whose resistance should be overcome in order that movement may begin. The second fold is not initially involved in the formal configuration but acts as a stabiliser of the first fold providing greater rigidity and stability to the area where they meet.

In some aspects, the spectacles according to the invention can be manipulated from an initial non-functional state to an assembled state suitable for use by modifying the configuration of the at least one stabilising means. In other words, the spectacles are converted from a first state of storage to a second state of use, by modifying the at least one stabilising means.

In the fastening area, the stabilising means allows a stable grip while facilitating handling by users. By comprising this stabilising means, the ease of placing and removing the spectacles from the nose in the fastening means is increased, which further improves reliability during use.

FIGURES

FIGS. 9a to 9d illustrate spectacles with details of the stabilising means in the bridge area according to an eighth aspect of the invention.

DETAILED DESCRIPTION OF THE INVENTION

Figure 1:
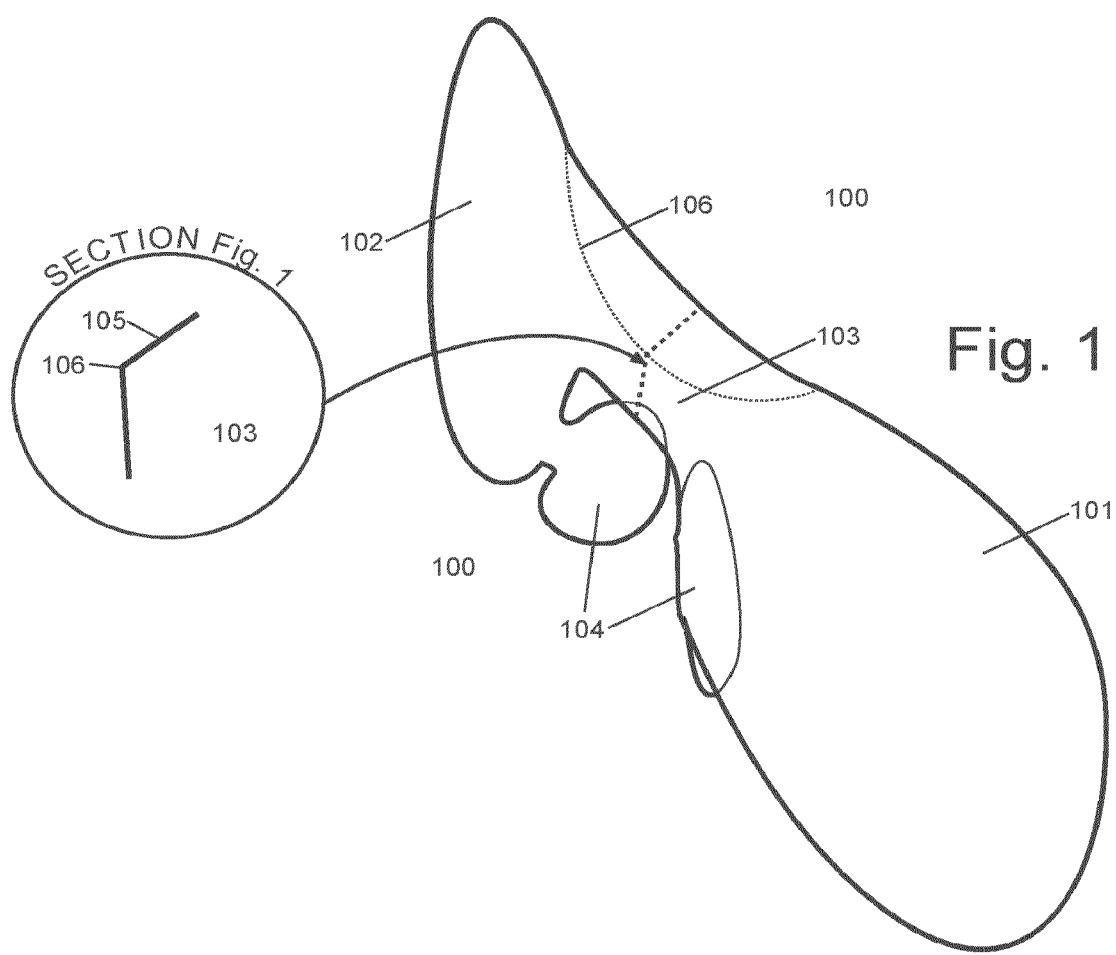
FIG. 1 illustrates spectacles of the prior art.

The spectacles described in this specification can be manufactured from a continuous sheet of material that already has the corresponding optical properties or that allows them to be easily provided using techniques known to the person skilled in the art. With this type of manufacturing, economic spectacles can be obtained that form a compact and continuous item in which all the individual parts of the spectacles are of a single material. Manufacturing from a continuous sheet of material can be carried out through the usual production systems, lowering manufacturing and associated costs, purchase of raw materials, assembly, and other. Preferably, the material is a continuous plastic sheet with suitable optical properties, for example a transparent polyester about 0.2 mm thick that may or not be coloured, although different materials can be used that provide optical properties for the designated needs or that allow to provide these optical properties easily.

Thus, the spectacles can be formed by a single material that comprises the different parts of this invention formed by a single piece. These different parts comprise at least two areas in front of or around the eyes with or without optical properties (for example, with optical properties for stereoscopy, without optical properties for a disguise or eye protection), also called optical areas herein, a bridge area that joins the two optical areas to each other, and fastening means configured to fasten the spectacles on the user's nose.

As for the fastening means, the pads of the spectacles form a system to adapt to the user's anatomy based on the clip effect. The pads represent protuberances that emerge transversely from the areas with optical properties towards the user's face, just at the lower part where the two inner sides of the optical areas connect, that is below the bridge area, on the central part of the spectacles. The pads can be moved due to a flexibility in the connection between the optical areas and the pads that gives the required pressure to fasten to the nose.

In addition, the spectacles have at least one stabilising means that provides rigidity and, thus, stability to the spectacles. In the prior art spectacles a folding in the bridge area or in the fastening means resists the forces perpendicular to the optical plane up to a certain intensity. Once the force exerted on these areas exceeds a threshold determined by the single folding, the bent surface outside the optical plane returns to that plane, collapsing, and the folding loses its resistance. This invention places another folding on that surface to stabilise it in a process analogous to those governed by the law of the lever: a small resistance can be multiplied with the distance to the point where the force to be neutralised is exerted. Once a second fold is made, a surface is delimited between the two folds and the first folding becomes much more stable. In addition, the present invention proposes, in some aspects, that this second fold is ensured by a factor that prevents it from disappearing or coming unfolded. For this purpose different configurations are proposed such as the geometric stress of the surfaces involved in the second fold, the bracing or anchoring of the surface distal to the bridge area, or the inclusion of another successive folding as if it were a succession of levers in series. The presence in the stabilising area of these solutions increases the rigidity of this area and, therefore, the overall stability of the spectacles.

The at least one stabilising means comprises at least two folding lines, or folds, substantially parallel and consecutively arranged in the transversal direction relative to the force vector. In one aspect, the stabilising means comprises exactly two folding lines, and in another aspect the stabilising means comprises more than two folding lines. In even another aspect, the stabilising means consists of exactly three folding lines. In this aspect of the invention, the stabilising means comprises the second folding line and, in addition, a third fold as a retaining means to ensure that the second fold retains its position.

In still other aspects, the retaining means or element can comprise a brace that joins the second folding line with the body of the spectacles, either in the bridge area or in the fastening means. These retaining means maintain the configuration of the folds resisting the forces that act during use, reinforcing the structural stability of the bridge area or the fastening means once assembled and being used by the user.

In yet another aspect of the invention, the retaining means of the second folding line is the geometric configuration of the planes which delimit it shortening one of them to force the fold at a certain relative position in the assembly, preventing the second line from disappearing under forces in a cross direction.

Therefore, at least one stabilising means with at least two folding lines can or not comprise retaining means. The invention successfully proposes spectacles having a greater resistance that can further include additional retaining means such as the shortening of a plane, a third fold or a brace.

In one embodiment, the stabilising means is located in the bridge area in an upper area of the latter. In another embodiment, the stabilising means is located in the fastening means. In even another embodiment, the spectacles are provided with a first stabilising means in the bridge area and another second stabilising means in the fastening means.

Figure 2:
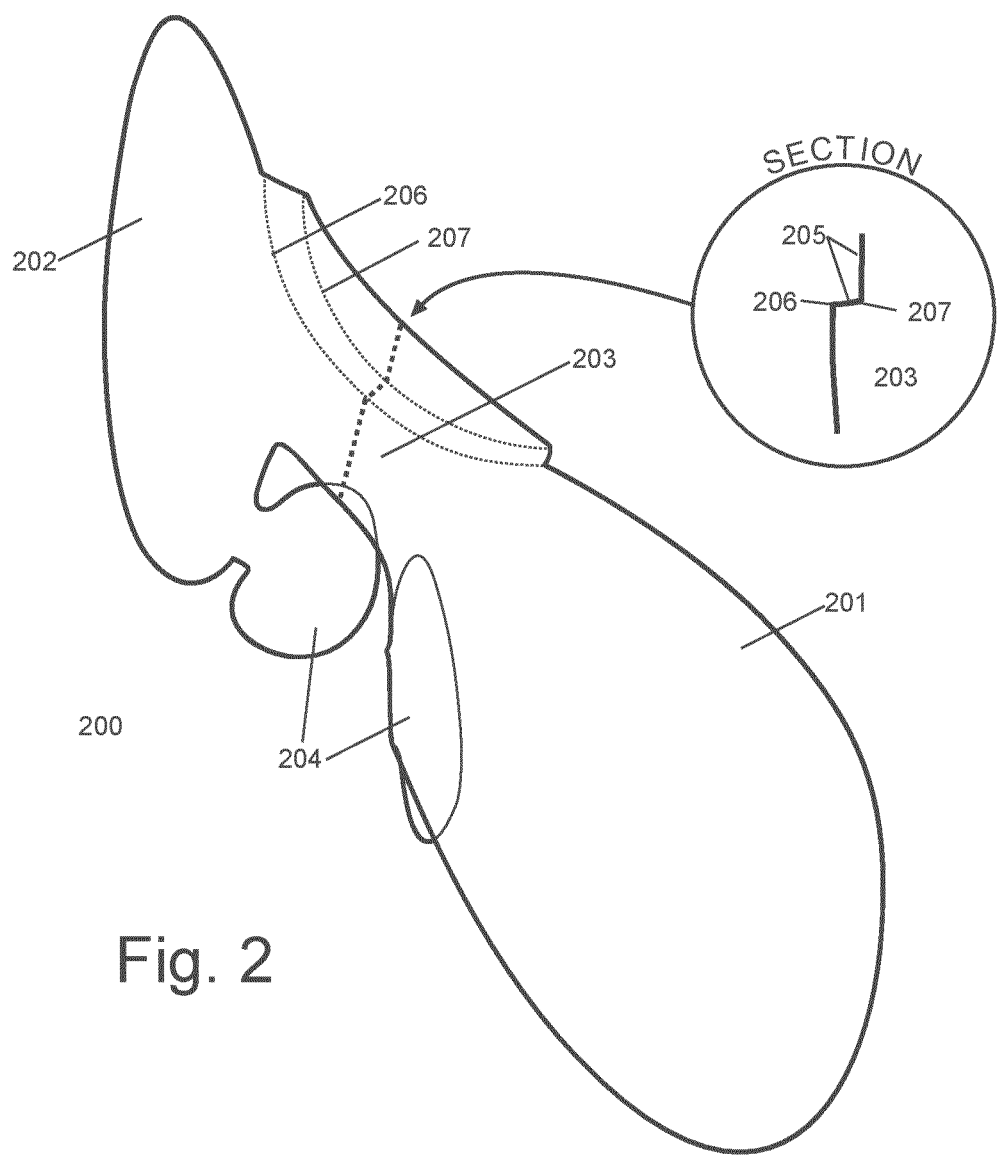
FIG. 2 illustrates spectacles with details of the stabilising means in the bridge area according to a first aspect of the invention.

FIG. 2 illustrates spectacles 200 according to the present invention in which all the parts are included in at least a single piece cut out from a sheet of continuous material. The spectacles 200 comprise two optical areas, first optical area 201 and second optical area 202. In addition, the spectacles comprise a bridge area 203 that joins the two optical areas 201, 202 in an upper inner area, and two pads 204 each one joined to a respective optical area 201, 202 in a lower inner area.

In this configuration, the stabilising means is in the bridge area and includes a first folding line 206 and a second folding line 207 consecutive to the first in the direction of the stress and transversely thereto. If the folding lines 206 and 207 were straight lines, folding line 206 could disappear, flattening, when the surface between folding lines 206 and 207 align with the plane of the rest of the bridge area 203 while folding line 207 would not be modified. In not being straight lines, the disappearance of folding line 206 would also attempt to flatten the folding line 207 whereby the presence of the folding line 207 added to the folding line 206 constitutes a means of stabilisation in the bridge area 203.

The folding lines 206 and 207 define a surface perpendicular to the stress that generates the reaction of the pressure of the pads on the user's nose. While that first surface, originated by the folding line 206 and delimited by the folding line 207, retains its position, the spectacles will maintain their proper configuration for use. The second surface that is defined between the folding line 207 and the end of the material is located transversely relative to the trend that could lead to the first surface to align with the rest of the bridge area. The presence of the first surface and folding line 206 configures and stabilises the shape of the surface of the spectacles while the presence of the second surface and folding line 207 stabilises the first surface and folding line 206.

Figure 3:
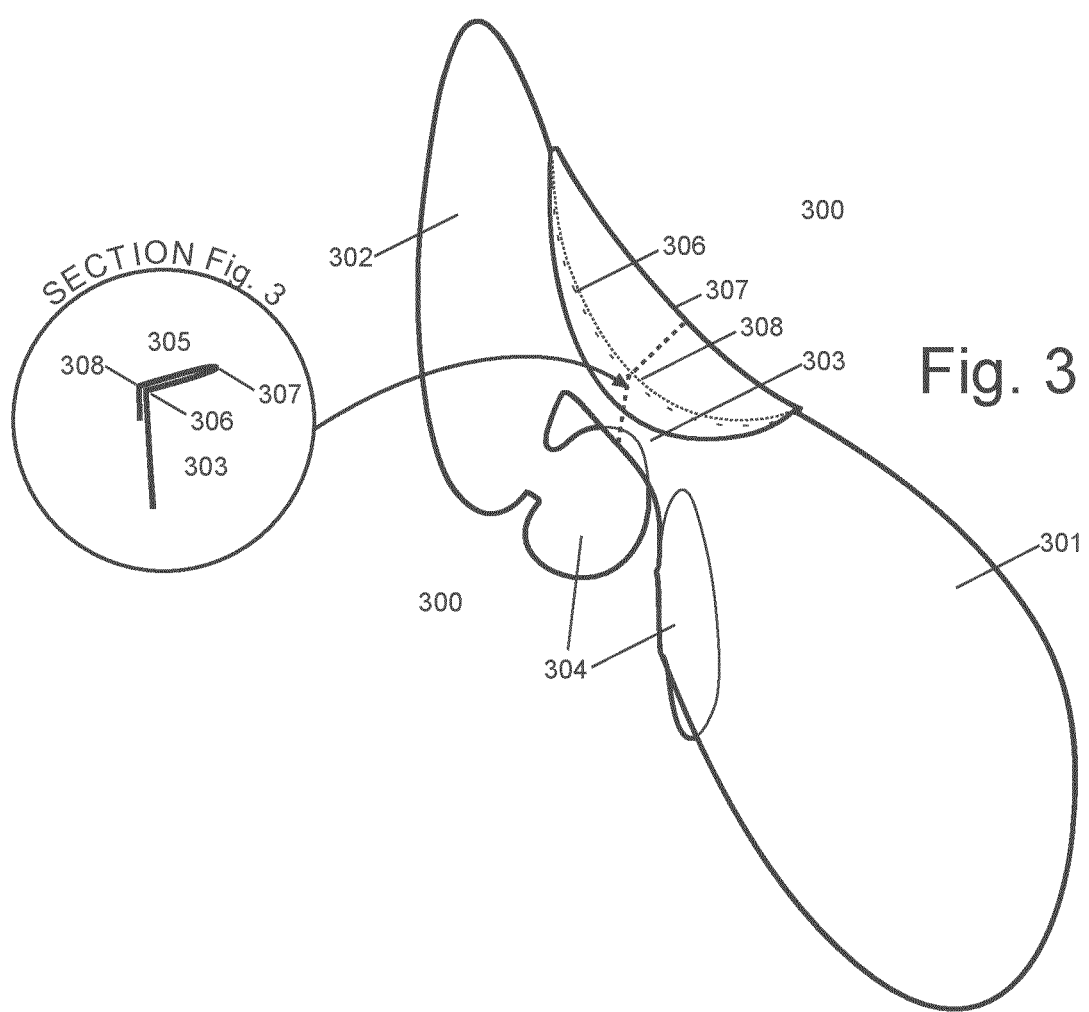
FIG. 3 illustrates spectacles with details of the stabilising means in the bridge area according to a second aspect of the invention.

FIG. 3 illustrates spectacles 300 in which the stabilising means is located in the bridge area and comprises exactly three folding lines that are basically parallel yet converging at the ends. The material of the spectacles in the stabilising means therefore bends three times on itself, first bending on the folding line 306, then on the folding line 307, and finally on the folding line 308. In this aspect of the invention, the stability provided by the three folds to the position of the surface between the folding line 306 and the folding line 307 is sufficient to withstand the stresses present during the use of the spectacles as the second folding line 307 acts as an effective stabilisation means of the folding line 306, duplicating the material on the first surface between the folding line 306 and the folding line 307, and the folding line 308 is an excellent retaining means of the folding line 307 in generating a third surface perpendicular to that situated between the folding line 307 and the folding line 308. That is to say, the distal end of the stabilising means is loose, with no connection, but if we attempt to unfold folding line 306 we will also find the resistance originated by the folding line 307 and the folding line 308.

FIG. 4 illustrates spectacles 400 according to this invention in which all the parts are included in at least a single piece cut out from a sheet of continuous material. The spectacles 400 comprise two optical areas, first optical area 401 and second optical area 402. In addition, the spectacles comprise a bridge area 403 that joins the two optical areas 401, 402 in an upper inner area and two pads 404 each one joined to a respective optical area 401, 402 in lower inner area.

In this configuration, the stabilising means is located in the bridge area 403, which comprises a central line 411 that folds the spectacles in half and a stabilising means 405 with first folding lines 406 and second folding lines 407. Said stabilising means 405 can be extended respectively to both optical areas 401, 402. The first 406 and second 407 two folding lines are premarked in the collapsed state for storage of the spectacles in which they are substantially flat, the optical areas 401 and 402 being in contact.

In this case the retaining means is the upper area of the stabilising means between the lines 407 and the edge 408 which presents a closed angle towards the optical areas above the second folding line 407. This angle implies a shortening of the material with respect to the natural fold and can be achieved by usual methods such as thermoforming. The retaining means 408 exerts a tightness in a direction perpendicular to the plane of optical properties.

Figure 4A:
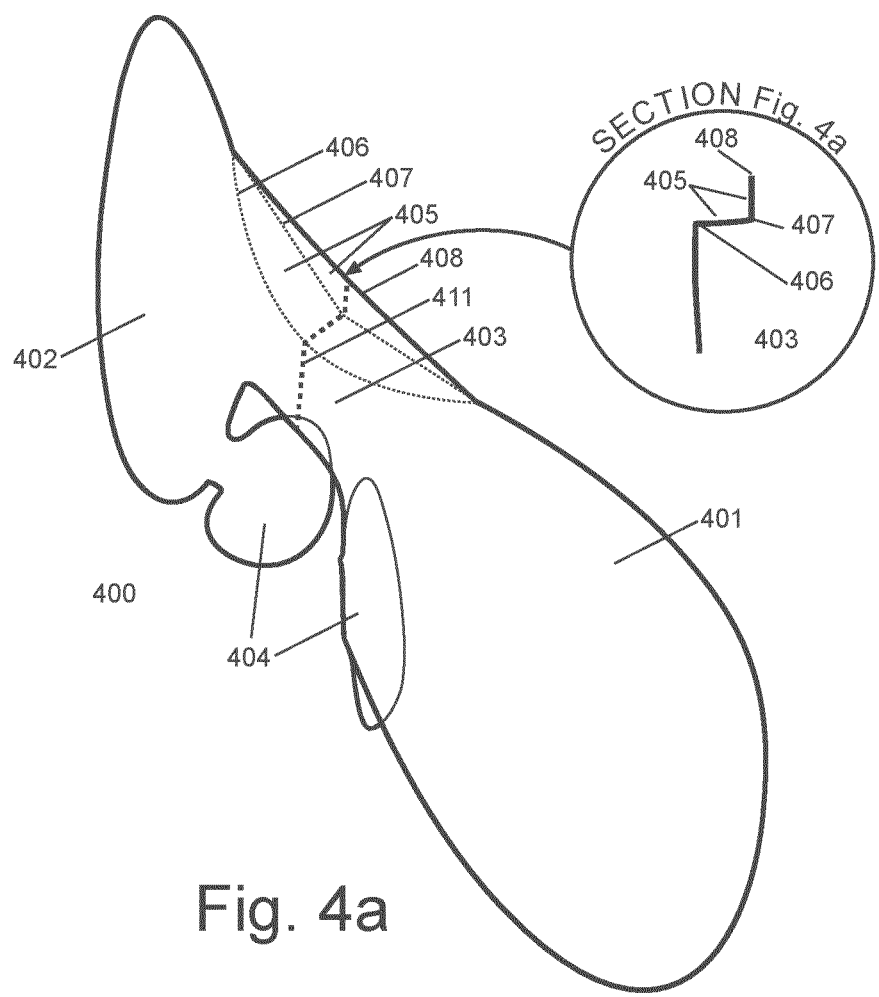
FIGS. 4a and 4b illustrate spectacles with details of the stabilising means in the bridge area according to a third aspect of the invention.

To unfold the spectacles 400, pressure must be exerted at the intersection point between the folding lines 407 and 411 while separating the areas 401 and 402. By increasing the force exerted, eventually an inflection point is exceeded and, even if one stops exerting pressure, the spectacles would not collapse again and they would adopt the assembled arrangement for use. Since the stabilising means 405 folds on the lines 406 and 407, a stabilising structure is formed in the shape of a double dihedral or rotated "Z" as indicated in the section of FIG. 4a. The end of the material is tensed at the upper part of the stabilising area 405 above the second folding line 407, and the first folding line 406, which is longer, must curve in an arc. In other words, double bending in this case provides more stability to the spectacles compared to prior art spectacles. This double dihedral angle resists stresses much better, especially in the anteroposterior axis, which the spectacles endure without collapsing.

The spectacles transitionally pass from the second state of use to the first storage state by localised pressure on the intersection point between the lines 406 and 411 while attempting to join the areas 401 and 402 in a process contrary to the aforementioned assembly. Analogous to that process, once exceeded a certain point, the spectacles collapse and remain permanently folded. To move from one state to another, the stress generated from the surfaces on the folding lines must be overcome. Therefore, the spectacles 400 are bistable and have two possible stable configurations that are easy to obtain. With a simple manipulation, the spectacles 400 transition from a non-functional initial stable state, suitable for storage or transport, to a stable, functional, assembled state, suitable for use for the intended applications.

Figure 4B:
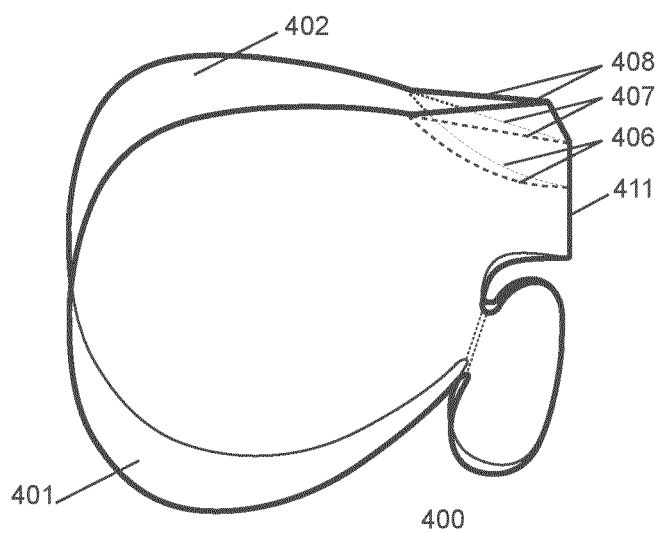

FIGS. 4a and 4b illustrate some spectacles 400 in which the stabilising means is in the bridge area and comprises exactly two folding lines. The material of the spectacles in the stabilising means is therefore bent twice on itself, first bending on the folding line 406, and then on the folding line 407. In this regard, the spectacles comprise retaining means to provide rigidity to the stabilising means. The retaining means is configured as an edge 408 with a shorter length than the length of the second fold 407. Once in the state of use (FIG. 4a), with the spectacles assembled, the retaining means generates a resistive force, in the axis perpendicular to the plane of optical properties, in the opposite direction to that needed to disassemble the spectacles to the first flat storage state (FIG. 4b). All these features provide a significant rigidity but in a more economical way as it reduces the amount of material of the spectacles. In addition, the design has an important aesthetic component adaptable to the consumer's liking.

The overall stability of the spectacles and the rigidity of the stabilisation means can be otherwise improved with the addition to the second folding line of a brace that secures the distal surface relative to the bridge area. In this way, the second folding line is secured and the folding lines achieve that the sheet of material configures a volume that presents at least one closed section in the bridge area. This can be achieved from a single cut out piece in which the stabilising means is tab-shaped in an unconfigured, unassembled state, in which it is still necessary to configure or at least preconfigure the closed section. Through the double folding of the means of stabilisation and connection of these with the rest of the bridge area, the closed section in an assembled state is obtained, configured for direct use on the user's nose. In this assembled configured state, the spectacles present a certain volumetry outside the plane. Advantageously, the assembled closed section allows it to be collapsed in the plane of the optical areas, the spectacles becoming flat, or substantially flat, to store them. This state can also be called pre-configured because it is possible for the user to be given the spectacles in this assembled state with the pre-configured closed section and with a few manoeuvres the closed section can be configured for use. This is particularly advantageous because it allows to easily change the volumetry of the spectacles and carry them during non-use in any flat or two-dimensional place like a book, a magazine, a wallet or a pocket.

Figure 5A:
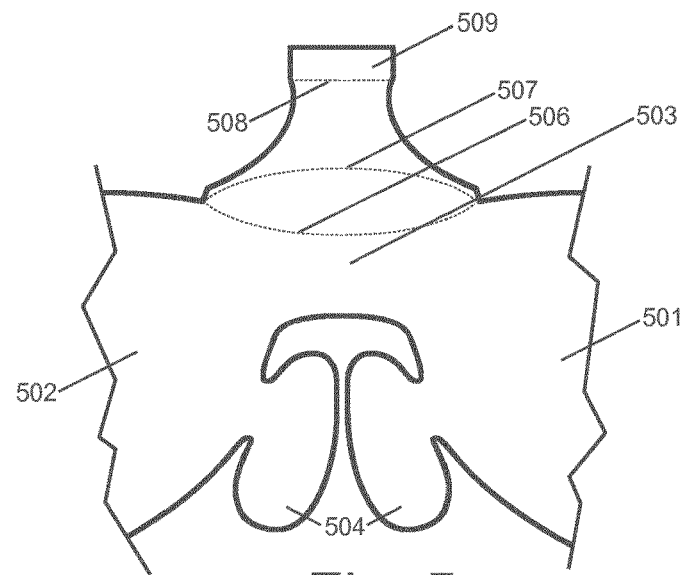
FIGS. 5a and 5b illustrate spectacles with details of the stabilising means in the bridge area according to a fourth aspect of the invention.
Figure 6A:
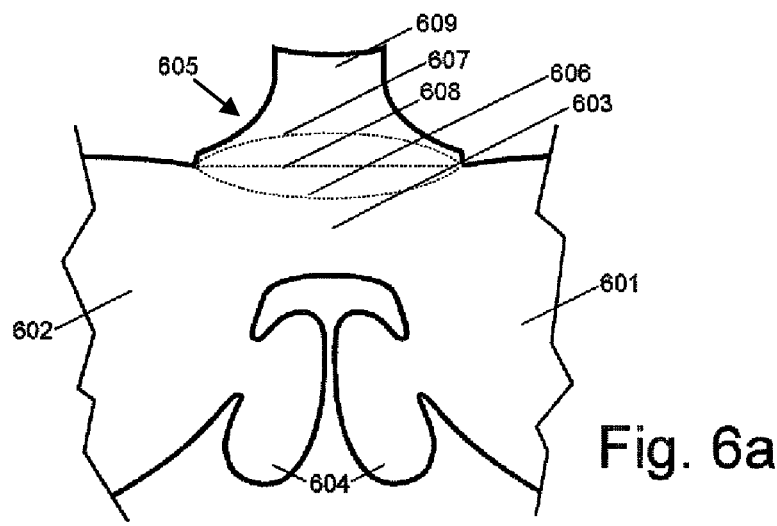
FIGS. 6a and 6b illustrate spectacles with details of the stabilising means in the bridge area according to a fifth aspect of the invention.
Figure 6B:
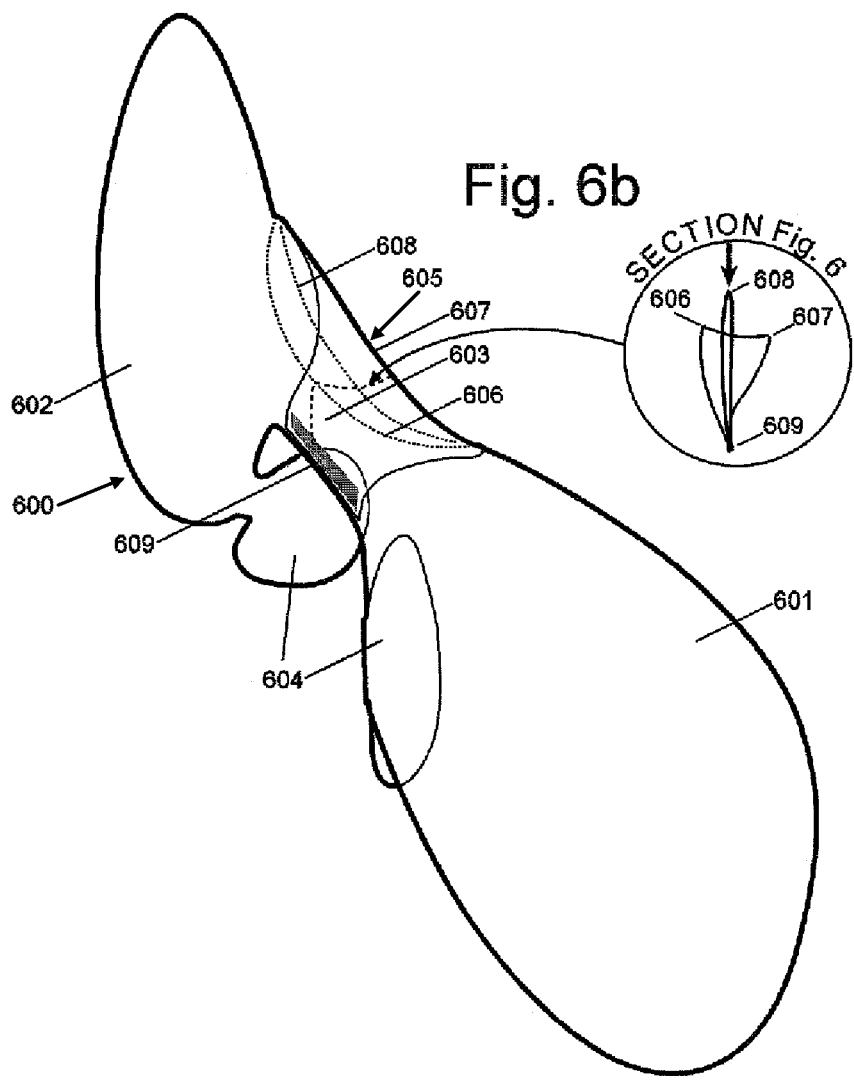

FIGS. 5a and 6a illustrate the outlines from which the spectacles 500, 600 with closed section can be obtained. All parts are included in at least a single piece cut out from a continuous sheet of material. As in the case of the spectacles 200, 300, 400, the spectacles 500, 600 comprise two optical areas first 501, 601 and second 502, 602, a bridge area 503, 603 that joins both optical areas in an upper inner area and pads 504, 604 each one joined to a respective optical area 501, 502, 601, 602 in a lower inner area. In these particular embodiments, in the upper part of the bridge area 503, 603 the stabilising means 505, 605 are disposed which also comprise at least two folding lines. Unlike the stabilising means 405 of the spectacles 400 in FIG. 4, the stabilising areas 505, 605 form a type of tab that folds and joins up again with itself, this overall folding forming a volume with a closed section in the bridge area 503, 603. This closed section can circumscribe an area (section of a volume) or collapse to form two contiguous lines (practically in one plane) as shown in the section of FIG. 6b and is obtained by usual forming procedures (folding, thermoforming, and so on). This closed section volume generates a stabilising structure with a higher resistance to the forces that are applied thereto improving the resistance that can be offered by the original sheet or the simple angle section offered by a dihedral like that of FIG. 1 and even some double dihedral. Therefore, a greater rigidity is obtained which increases the overall stability of the spectacles.

Figure 5B:
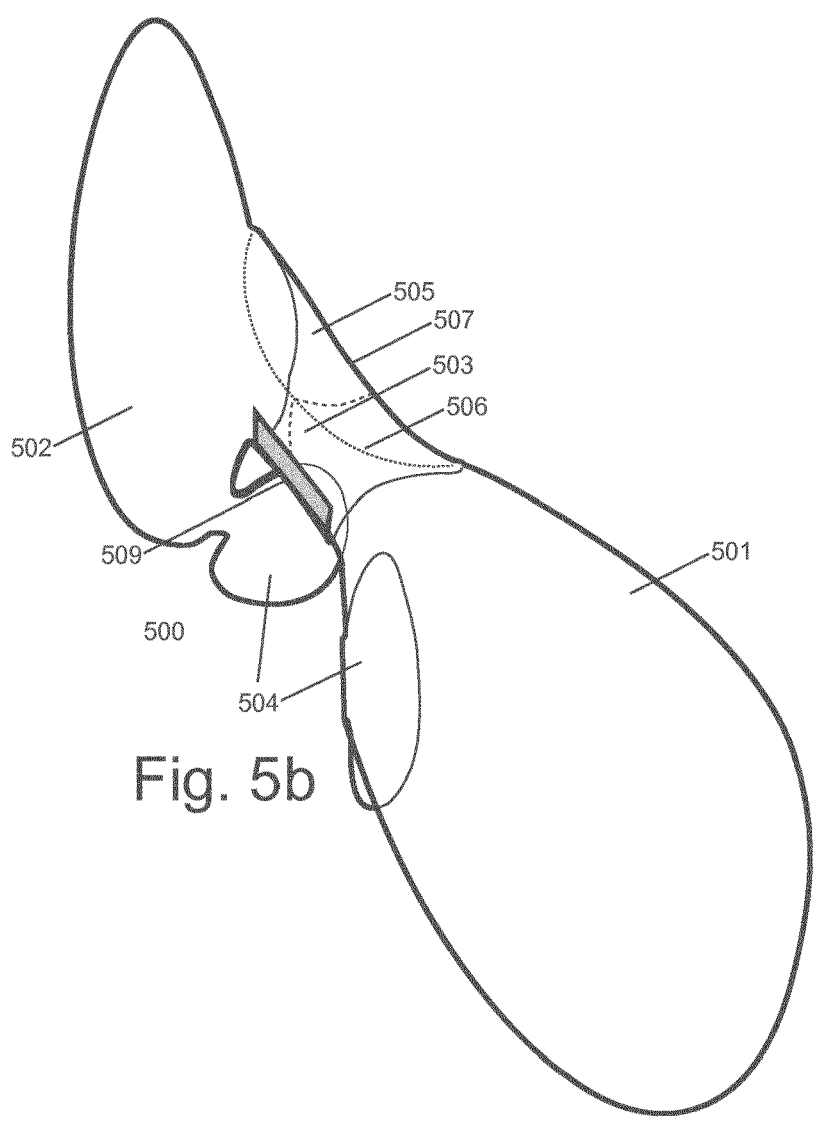

As can be seen in FIG. 5b, the tab forming the stabilising area 505 comprises three folding lines, first 506, second 507 and third 508. At the outer end of the tab 505 there is a connection area 509 which serves to attach or join the tab in the bridge area 503 at a lower part on the side facing the user's face or on the side facing towards the visual direction. Apart from its structural characteristics that can be obtained, the tab 505 allows the user to easily assemble the spectacles 500 from a first pre-configured unassembled state to a second configured assembled state. In addition, when the tab 505 is assembled forming the closed section in the bridge area 503, the user can switch between a first configured state in which the spectacles 500 are ready for direct use and present a volumetry and a second pre-configured state in which the spectacles 500 can be stored and are substantially flat.

The tab 605 of the spectacles 600 comprises three folding lines, first 606, second 607 and third 608 as illustrated in FIG. 6b. In addition, the outer end 609 of the tab 605 does not need such a large and collapsible connection area as in the case of the spectacles 500. The connection area 609 of the spectacles 600 is the outer edge 609 of the tab 605 which when assembling the spectacles from a first pre-configured unassembled state to a second pre-configured assembled state joins in the bridge area 603 to a lower part thereof on the side facing the user's face. It may be a little more difficult to assemble the tab 605 compared to the tab 505. However, the tab 605 requires less material than the tab 505 so costs can be saved on material. Similarly as for the tab 505, the tab 605 also allows the user to easily assemble the spectacles 600 from a first pre-configured unassembled state to a second pre-configured assembled state. In addition, when the tab 605 is assembled forming the closed section in the bridge area 603, the user can switch between a first configured state in which the spectacles 600 are ready for direct use and present a volumetry and a second pre-configured state in which the spectacles 600 can be stored and are substantially flat.

The assembling of the tabs 505, 605 is as follows. By folding the tab 505, 605 over the bridge area 503, 603 between the first optical areas 501, 601 and second optical areas 502, 602 at least one double layer of material is obtained by superposition of the sheet which forms the tab 505, 605. This is achieved by obtaining in the cut-out outline a tab 505, 605 protruding from the upper part of the spectacles above the bridge area 503, 603, bending or folding it along the area between the first optical areas 501, 601 and second optical areas 502, 602 and attaching or joining it in the bridge area 503, 603 through the connection area 509, 609 by means of usual procedures such as thermowelding, adhesive application, crimping, and the like, resulting in a bridge area 503, 603 which comprises in the pre-configured assembled state two or more layers of material. If these at least two layers of material are kept separate avoiding a direct contact, that is to say that they form a hollow closed section volume, they constitute highly resistant stabilising means 505, 605 with a inertial momentum against the flexion of the spectacles 500, 600 at the bridge area 503, 603 which is much greater than that offered by a simple dihedral resulting from a fold as shown in aforementioned FIG. 1. This stabilising area 505, 605 is resistant because the surface between the folding lines 506-507, 606-607 is maintained approximately perpendicular to the plane where the forces are produced. This surface is stabilised, in turn, by the second folding line 507, 607 which generates a second surface perpendicular to the first one and the presence of the tab which secures the same. The folded sheet of material encompasses a volume being equivalent to a tube or a beam forming the hollow closed section. This volume of the hollow closed section presents a main axis or neutral line that is perpendicular to those anterior and posterior stresses to be neutralised, in achieving that the surfaces of that volume are able to operate resisting the traction or the compression in the same way as the faces of a prism, a tube or a beam do. In any case, the hollow closed section delimited with the folded tab 505, 605 tends to be retained provided its limit of resistance is not exceeded, this being much greater than that of a simple dihedral or even a double dihedral or many other open structures.

Thus, the stabilising area 505, 605 can be configured as assembled from manufacture with the section closed permanently or it can be delivered to the user in a pre-configured unassembled or collapsed state, so the latter can manipulate the spectacles to give them configuration before use with the resistant closed section. The design that allows the above should, in the first place, be capable of being developed in one plane to enable, if desired, starting from a single piece extracted from a sheet. Secondly, the folding of the sheet when folding on itself should be able to generate a closed section that tends to be maintained under the stresses of use, presenting an inertia momentum with respect to the axes that pass through that closed section, especially the anteroposterior one. Thirdly, one can opt for a design with the structure of the permanently assembled pre-configured closed section in a collapsed initial presentation in which the definitive closed section for use can be easily obtained, in this case, being a bistable structure, stable in a first pre-configured situation, assembled, collapsed and stable in a second assembled configured situation.

FIG. 6a illustrates spectacles 600 in which there are two pre-marked folding lines, first 606 and second 607, that are fully defined as edges when pressing on edge 608 and remain stable in their function of delimiting the planes of the resistant closed section as all or part of the central edge 608, which has been pressed, beyond the level of the surface that would join the first side edge 606 and second side edge 607. In other words, by exerting sufficient pressure on the line 608 where the tab 605 folds, this edge 608 will collapse becoming a concave plane framed by the concave folding lines, first 606 and second 607, and the assembled and configured spectacles are obtained.

As observed from the diagram, the cross section of the bridge area 603 has three lines that form a polygon that in this case constitutes something similar to a triangle instead of two contiguous parallel lines. The concave area between 606 and 607 together with the two surfaces that are on the inner and outer part of the bridge area 603 configure a structure that resists the stresses that tend to deform the bridge area 603 forward when using the spectacles 600.

The concavity formed of the stabilising area 605 is stable and does not re-bend on the central line 608 so that the bridge area 603 becomes flat again unless it is forced to do so by pressing the two surfaces, inner and outer, one against the other. In this way, we obtain a highly rigid and stable structure in the two positions, that is to say a bistable structure: flat for resting or storage, and volumetric during use. The bridge area 603 is suitable to be stored and delivered flat and, with a simple manipulation by the user, it becomes a kind of triangular section beam.

The spectacles 500, 600 are illustrated in FIGS. 5a and 6a in a pre-configured unassembled state, and FIGS. 5b and 6b display the spectacles 500 and 600 in a configured assembled ready-to-use state. FIG. 5a corresponds to the spectacles 500 of FIG. 5b, and FIG. 6a corresponds to the spectacles 600 of FIG. 6b.

In a similar way, it might be desirable to deliver the spectacles without fastening arms and closed section stabilising means not only flat, but even folded in half for a more convenient storage as in the case of spectacles 400. FIG. 7c illustrates such folded spectacles 700 in which the first optical areas 701 and second optical areas 702 (not shown in the figure) are placed against each other, with the bridge area 703 folded in two of the assembly 700 to be unfolded at the time of use as illustrated in FIG. 7b. For the sake of simplicity, only one side of the spectacles 700 is shown in FIG. 7c so only one optical area, here the optical area 702, and one pad 704 appear. This presentation could be that of choice in some applications due to the minimum space needed. To achieve that the bridge area 703, previously folded in half, can be a structural element when the spectacles 700 are going to be used, it is again proposed to provide the bridge area 703 with stabilising means 705 in the bridge area 703 that are configured with a simple manipulation, generating a resistant closed section volume when the assembly is unfolded 700, when the first optical area 701 and second optical area 702 are placed in the use position as shown in FIG. 7b.

Figure 7A:
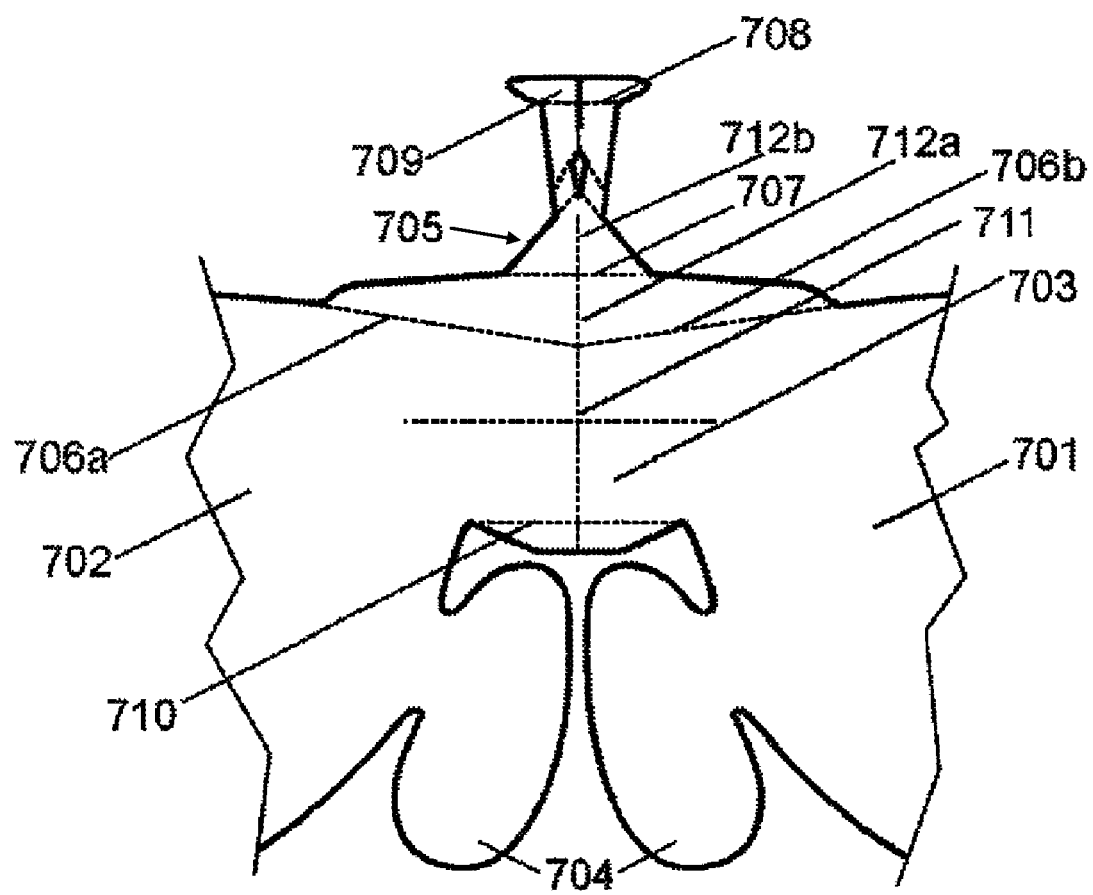
FIGS. 7a to 7c illustrate spectacles with details of the stabilising means in the bridge area according to a sixth aspect of the invention.
Figure 7B:
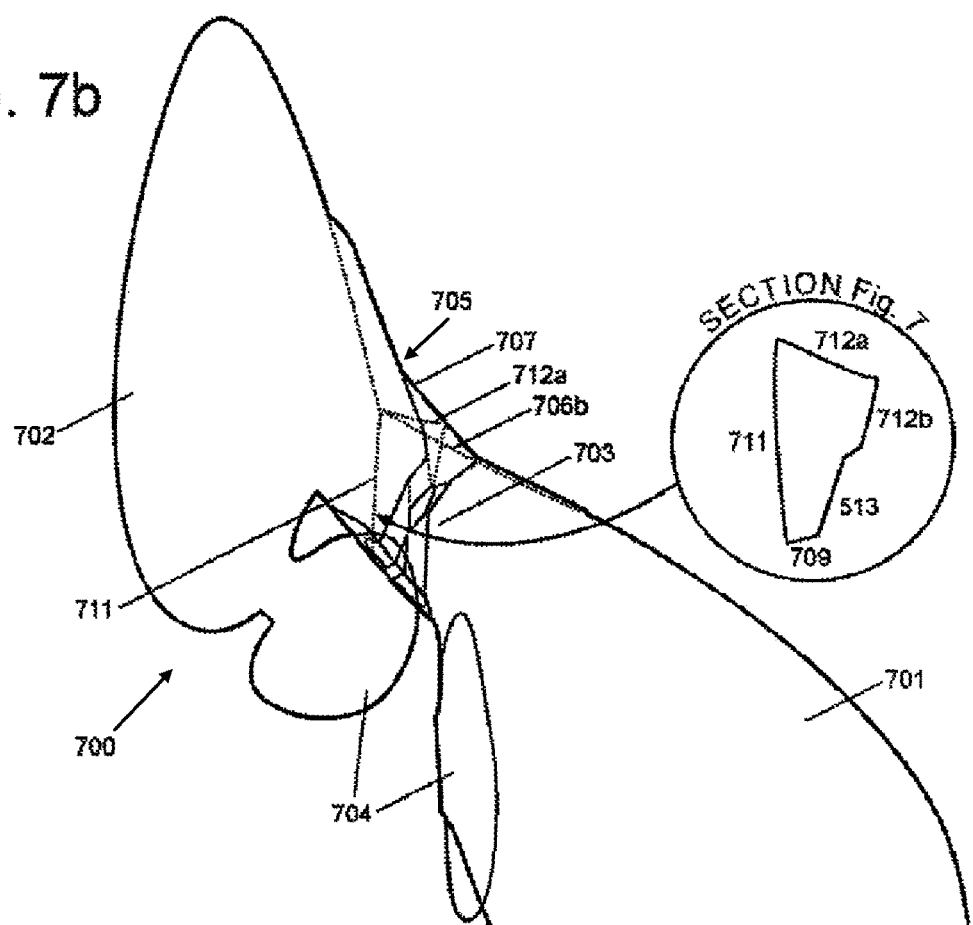
Figure 7C:
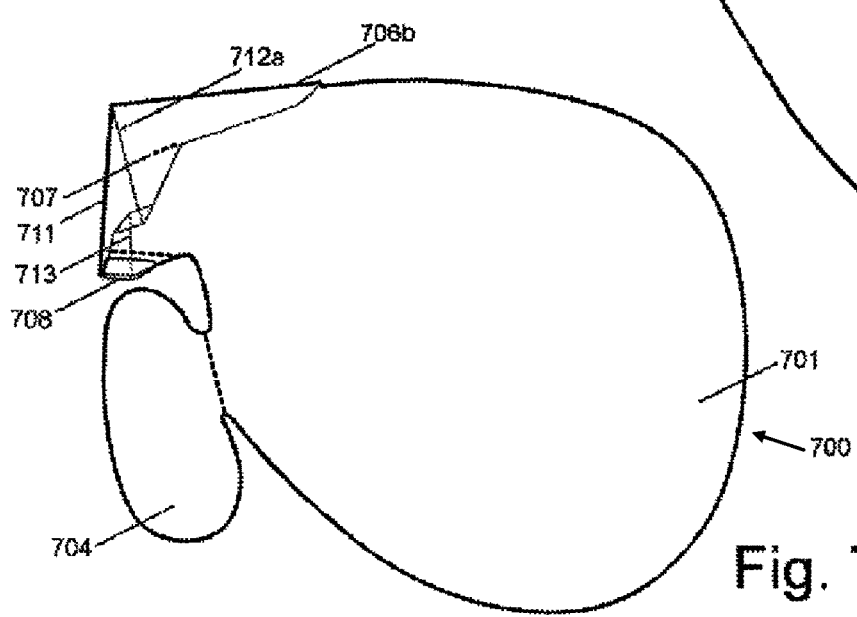

For this application, as can be seen in the flat development of the central part of the spectacles 700 in FIG. 7a, it is proposed that the folding line to fold the stabilisation means or tab 705 over the rest of the bridge area 703 is composed of two symmetrical lines, first 706a and second 706b, with respect to a vertical central axis 711 which is where the spectacles 700 will centrally fold. As the folding lines 706a and 706b form an angle smaller than 180°, the central folding edges of the surfaces, inner surface 712 and outer surface 711, of the bridge area 703 are not in direct contact but separate as they move away from the folding line formed by the lines 706a and 706b where the tab 705 folded over the bridge area 703.

When unfolding the spectacles 700 by separating the first optical area 701 and second optical area 702, the inner tab 705 tends to move towards the horizontal lifting the two areas contiguous to the edges 706a and 706b. If a pre-marked line 707 transverse to 712 is established to separate two areas of material and this tab 705 has retaining means at its end 708 that prevents it from being able to move away from the front part of the bridge area 703, when the spectacles are unfolded, by pulling the ends of the surface of the first optical area 701 and second optical area 702, stress is generated on the surface of the inner part of the bridge area 703 that tends to form a trapezium in the cross section of both surfaces. The material between 706 and 707 tends to the horizontal and that between 707 and 708 acts as a brace.

In other words, the stress caused when attempting to separate the first optical area 701 and second optical area 702 leads the edge 712 to separate from the line 711 until it finds that the line 707 generates an edge on the other side of which the surface around the cut 713 acts as a brace until the areas 709 attach to area 710.

In the transversal section, these lines end up defining two resistant dihedral angles, in the outer and inner parts of the bridge area 703, braced from behind in something close to a trapezium as seen in the detailed section of FIG. 7b whose four edges are: 711, 712a, 712b-713 and 709. This trapezium is a section of a hollow volume forming a closed section that gives resistance to the sheet surfaces that form it as it constitutes a geometric body resistant to the stresses that the bridge area 703 endures in the use of the spectacles 700. If we draw a similar development to that of FIG. 7a which then turns and folds over itself delimiting a closed section, a mechanical prism is obtained as seen in FIG. 7b, being resistant in the desired direction.

In pulling the first optical area 701 and second optical area 702, the dihedral defined by 706a-706b and 712A-712b passes through a point in which it is forced to bend at 707 after passing through an instant of resistance when the sheet is tensed. When overcoming this inflection point and generating the edge 707, the stress in the material decreases without disappearing so the new arrangement is maintained and it does not tend to fold back. This position is so stable that, to refold the spectacles, it is necessary to push the vertex between 712A-707-712b inward until overcoming the point where the stress ceases to exist and the spectacles collapse at the joints to the stable folding position.

What is achieved with a bridge area 703 conceived in this way is the same as mentioned above: the surface between the folding line 706 and the folding line 707 resists the force from the pad reaction that pushes the optical areas forward and the surfaces braced between the folding line 707 and the folding line 708 reinforce the position of the former stabilising it. The surfaces of the sheet of thin material are configured in a mechanism with a prefixed internal structure to surround a volume from which we could extract infinite areas that tend to remain even subject to stress in various axes; they are areas with sufficient moments of inertia to withstand the expected stresses in various axes, especially the anteroposterior ones, during use of the spectacles.

This type of solution in which the sheet of material is folded twice and is braced generating a hollow volume with a strong closed section also serves for the better holding of, for example, the handler—pad assemblies by the user. The sheet that will form these assemblies can be cut out such that, when turning it over and attaching it on itself, it generates a resistant closed section that supports finger pressure thereon. In addition, the closed section forming the handling means of the fastening means may present planes that come into contact with the fingertips perpendicularly to give greater safety, reliability and firmness in handling.

Figure 8A:
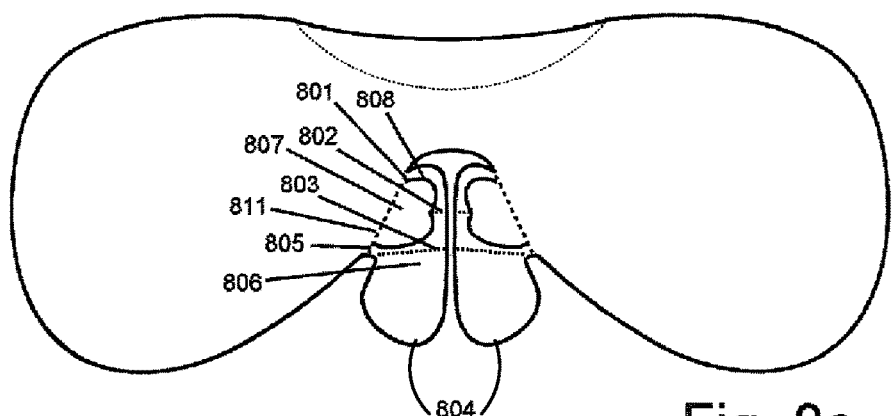
FIGS. 8a to 8c illustrate spectacles with details of the stabilising means in the bridge area according to a seventh aspect of the invention.

An example of this would be the outline of FIG. 8*a* that provides spectacles 800 comprising pads 804 of desired length without limiting the width of the bridge area 803 as they can be made of the surface desired without affecting other parts such as the optical areas in the spectacles of the prior art. The spectacles 800 can be any of the above spectacles. However, the pads 804 are not limited to spectacles without fastening arms described in this description but can also be applied to other spectacles without fastening arms. For the sake of simplicity, the stabilising area 805 in the bridge area 803 is illustrated only schematically without showing all the possible details.

Figure 8B:
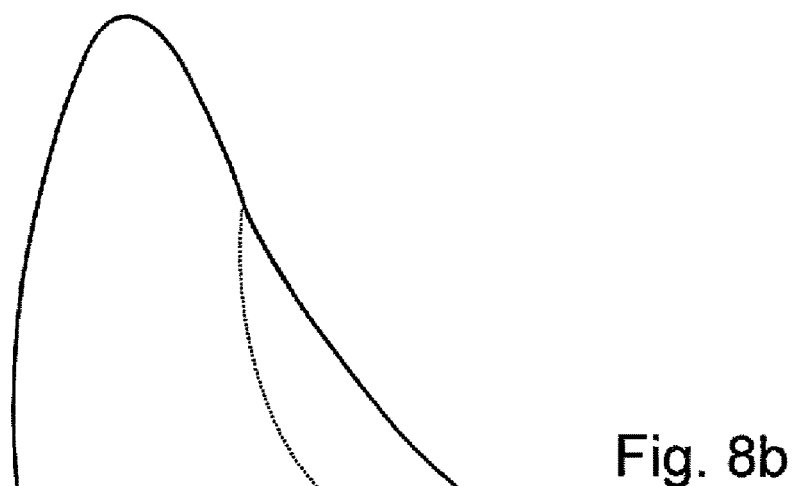
Figure 8C:
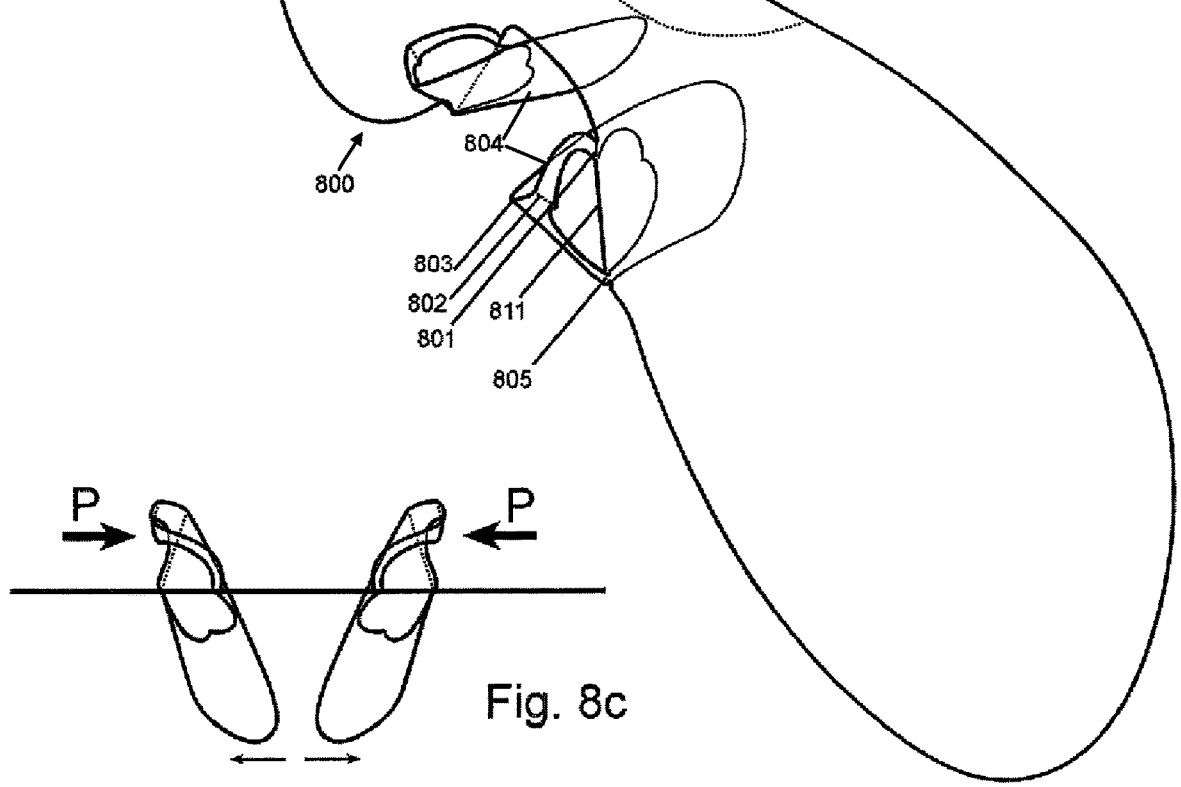

The pads 804 are initially pointing downwards but, when bent at the lines 801, 802 and 803, pivoting around area 805 placing the pad in position, bending the areas 807 backwards at the lines 811 and attaching the areas 806 and 807 to each other, a closed section is obtained as can be seen in FIG. 8*b* with the plant view of the pads 804 shown in FIG. 8*c*. These sections closed at the handling means FIGS. 8*b* and 8*c* are capable of withstanding the pressure of the fingers in the direction of the vector P shown in FIG. 8*c* when holding the spectacles 800 and opening the pads 804 to place them on the nose or remove them after use.

The area 807 acts as a spring that tends to close the pads 804 thanks to the tendency of the material in this area to return to its initial position before folding at line 811. In order to obtain area 807, it is necessary to make a cut 808 that separates it from the rest of the pads 804. This line 828 in the handling and holding area is a subtle edge that, when pressed, comes into contact with the skin shaping it around it, managing to fix its position and giving the safety and reliability that is sought in the use of the spectacles 800. This line 808 can be made in such a way that it leaves a pointed area of material in the vicinity of the folding line 802 so that the user's fingers when handling the spectacles can come into contact and press not only a surface on which they could slip, which is insecure, but also on an edge that slightly digs into the fingertips. Under the stresses generated by finger pressure, the folding line 803 could flatten if not provided with a second folding line 802 which, in turn, is secured by a retaining means such as the brace that binds it to 801. This assembly constitutes a stabilisation means that maintains the edge 808 in the proper position for handling the spectacles in a reliable and comfortable way.

In the same way as with the bridge area of the spectacles, it can be favourable to have some fastenings and pads that can be folded until being completely flat before using the spectacles. FIG. 9*a* shows an outline similar to that of FIG. 8*a* which also provides a closed section handling means suitable to safely use the spectacles. In this case, to ensure that this section can be substantially flat, the distance between 902 and 903 can be made to be the same as that between 901 and 904. In this case, a polygonal closed section resistant to the pressure but articulated would be obtained like the plan view of the pads and handling means 904 of FIG. 9*c*. If a cut line 908 is additionally provided to come into contact with the fingers, a collapsible or flattenable closed section is obtained under a pressure like P', but that moves the pads 904, opening them safely under a pressure P.

In this case, the polygon formed in sections similar to that of FIG. 9*c* operates as indicated above for the case of the bridge area 503, 603: like a beam in which, under certain pressure, one of the sides can operate by traction and the other does so by compression. Thus, the plane 901-902 supports by traction the finger pressure P while the planes 902-903 and 903-911 form a deformable dihedral in FIG. 9*c* that makes the pad 904 pivot on the axis originated by 911. The movement of the plane 902-903 is approximately parallel, as shown in the two positions in FIG. 9*c*, to the trajectory of the finger during the operation, keeping almost perpendicular to the corresponding fingertip. The pressure P exerted has to overcome the tendency of the pads 904 to close by the force, among others, of the fold 911 and, at the same time, to secure the fingers on the spectacles 900 thanks to the edge 908 to facilitate the placement and removal on the user's nose.

Similarly to what is achieved by the line 808 of the spectacles 800, if the line 908 is misaligned relative to the folding line 902, the resulting edge will protrude from the fold 902 originating a protrusion that slightly digs into the fingers of the user who exerts the pressure P.

FIGS. 9*a*, 9*c* and 9*d* show that some holes 909 can be made in the area of pads 904 which fasten to the user's nose to improve the adaptation to the surface and the attachment, while also serving to partially insert the ends 910 as shown in FIG. 9*d* leaving the pads 904 locked and flat until the time the spectacles 900 are used.

The pads 804, 904 provided with means of stabilisation in the handling means enable the user to accurately place the spectacles. The pads 804, 904 remain open by finger pressure on the handling means until the spectacles are in position. Once placed, that pressure is reduced and the pads become fixed when closed pressing against the user's skin. Bearing in mind that they can be placed in this way, this type of pads 804, 904 can have a suitable adhesive applied to the surface in contact with the user's nose to further secure the position of the spectacles. Examples of these types of adhesives that adhere to the skin can usually be found in objects such as sanitary dressings, plasters and even wigs, hairpieces and similar, that allow being placed with a certain firmness and removed without inconvenience for the user.

The pads 804, 904 that have two folds and closed sections when configured can be used with any of the spectacles described in this specification. In particular, the combination of the pads 804, 904 with spectacles also presenting stabilisation means in the bridge area results in spectacles that can be easily and reliably handled and at the same time provide great improved stability on the user's nose compared to spectacles without such stabilising elements.

What has been described comprises several embodiments as examples. The pads have been represented only for the purpose of illustration to indicate the existence and approximate location of a fastening means. Since it is not possible or feasible to describe all the variations of combinations and permutations of the inventive concept that would give rise to a large number of embodiments and redundant paragraphs, it is understood that the person skilled in the art would infer these different possible permutations and combinations of the different embodiments and aspects described after a direct and objective reading of this disclosure. Therefore, the main aspects and embodiments have been described, being understood that they comprise all other combinations, variations and modifications, whilst comprised within the scope of protection defined by the claims. The person skilled in the art would understand that the description of the embodiments does not limit the invention, nor do the drawings.

In the following, example embodiments are further disclosed:

Spectacles of at least a single piece of continuous material without fastening arms, of the type whereby the spectacles are supported on a user's nose, wherein the spectacles comprise: at least two optical areas in front of or around the eyes; at least one bridge area between the at least two optical areas; a means of fastening to the nose that tend to close in planes substantially perpendicular to the plane of optical properties; and at least one stabilising means that provides rigidity and facilitates the handling of the spectacles by the user.

The spectacles, wherein the at least one stabilising means is arranged in the bridge area, or in the fastening means, or both. The spectacles, wherein the at least one stabilising means comprises at least a first and a second folding line, or folds, which define a surface between them and are consecutively arranged in the transversal direction relative to the force vector they resist. The spectacles, wherein the at least one stabilising means comprises exactly two folding lines, or exactly three folding lines, or at least three folding lines. The spectacles, which comprise a first state of storage and a second state of use, and wherein the at least one stabilising means is configurable to change the spectacles from the first state to the second state and from the second state to the first state. The spectacles, wherein the at least one stabilising means is configurable to change the spectacles from the first state to the second state by folding the material at the folding lines. The spectacles, wherein the at least one stabilising means, after folding, has the shape of a double dihedral angle. The spectacles, wherein the at least one stabilising means, after folding, has at least one concave area. The spectacles, wherein the at least one stabilising means forms after said folding a volume with at least one collapsible closed section in a plane, preferably in the plane of the two optical areas. The spectacles, wherein the at least one stabilising means further comprises a retaining means that joins the second folding line with the body of the spectacles, either in the bridge area or in the fastening means. The spectacles, wherein the retaining means is configured by shortening the outer edge of the stabilising means relative to the second folding line. The spectacles, wherein the retaining means comprises a hole or cut with a size sufficiently large so that one end of the stabilising means can be inserted and attached in the hole. The spectacles, wherein the configuration of the retaining means generates a tightness in the direction perpendicular to the optical plane. The spectacles, wherein the configuration of the retaining means generates a resistance in the direction parallel to the optical plane. The spectacles, wherein the at least one stabilising means is configured to be able to fold the spectacles in half such that the at least two optical areas are placed against each other in a storage state. The spectacles, wherein the at least one stabilising means comprises at least one connection area. The spectacles, wherein the at least one stabilising means is arranged in an upper area of the at least one bridge area. The spectacles, wherein the at least one stabilising means comprises multiple folding lines forming together with the at least one bridge area at least one closed section comprising four edges. The spectacles, wherein the at least one stabilising means is tab-shaped in the first state and forms, after folding, at least one closed section. The spectacles, wherein the closed section is collapsible to change from the second state of use to the first flat state of storage. The spectacles, wherein the fastening means comprises two parts corresponding to both sides of the nose, and a stabilising means is arranged in each part of the fastening means providing rigidity to the fastening means. The spectacles, wherein the fastening means, preferably in the form of pads, are each movably attached to a respective optical area. The spectacles, wherein the two stabilising means, each one arranged in the respective fastening means, form handling means configured to be able to fold and form a closed section facilitating handling by the user. The spectacles, wherein the fastening means are joined to at least one spring area each. The spectacles, wherein the two stabilising means of the handling means comprise one cut each which is configured to form an edge on which the user's fingers press. The spectacles, wherein the at least two means of fastening to the nose comprise an adhesive on the surface in contact with the nose. The spectacles, wherein the material of the spectacles is a plastic sheet with optical properties suitable for each application case and a thickness of about 0.2 mm. The spectacles, wherein the material of the spectacles is transparent plastic, coloured or not.

The invention claimed is:

1. Spectacles of at least a single piece of continuous material without fastening arms, of the type whereby the spectacles are supported on a user's nose, wherein the spectacles comprise:
   at least two optical areas in front of or around the eyes;
   at least one bridge area between the at least two optical areas;
   a means of fastening to the nose that tend to close in planes substantially perpendicular to the plane of optical properties; and
   at least one stabilizing means comprising at least a first and a second folding line, or folds, which define a surface between them and are consecutively arranged in the transversal direction relative to the force vector they resist providing rigidity and facilitating the handling of the spectacles by the user, wherein the at least one stabilizing means is arranged in the bridge area, or in the fastening means, or both, and further comprises retaining means configured to maintain the configuration of the folds resisting the forces that act during use.

2. The spectacles according to claim 1,
   wherein the retaining means are configured from the folding lines with a curvature that prevents the disappearing of the first without the disappearing of the second; or
   wherein the retaining means of the at least one stabilizing means is configured by shortening the outer edge of the stabilizing means relative to the second folding line; or
   wherein the retaining means joins the second folding line with the body of the spectacles, either in the bridge area or in the fastening means; or
   wherein the retaining means comprises a hole or cut with a size sufficiently large so that one end of the fastening means can be inserted and attached in the hole.

3. The spectacles according to claim 1, wherein the configuration of the retaining means generates a tightness in the direction perpendicular to the optical plane or wherein the configuration of the retaining means generates a resistance in the direction parallel to the optical plane.

4. The spectacles according to claim 1, wherein the at least one stabilizing means is arranged in an upper area of the at least one bridge area.

5. The spectacles according to claim 4, wherein the at least one stabilizing means comprises multiple folding lines forming together with the at least one bridge area at least one closed section comprising four edges.

6. The spectacles according to claim 5, wherein the at least one stabilizing means is tab-shaped in the first state and forms, after folding, at least one closed section.

7. The spectacles according to claim 6, wherein the closed section is collapsible to change from the second state of use to the first state of storage.

8. The spectacles according to claim 1, wherein the fastening means comprises two parts corresponding to both sides of the nose, and a stabilizing means is arranged in each part of the fastening means providing rigidity to the fastening means.

9. The spectacles according to claim 8, wherein the fastening means are each movably attached to a respective optical area.

10. The spectacles according to claim 9, wherein the two stabilizing means, each one arranged in the respective fastening means, form handling means configured to be able to fold and form a closed section facilitating handling by the user.

11. The spectacles according to claim 9, wherein the fastening means are joined to at least one spring area each.

12. The spectacles according to claim 11, wherein the two stabilizing means of the handling means comprise one cut each which is configured to form an edge on which the user's fingers press.

13. The spectacles according to claim 8, wherein the at least two means of fastening to the nose comprise an adhesive on the surface in contact with the nose.

14. The spectacles according to claim 1,
which comprise a first state of storage and a second state of use, and wherein the at least one stabilizing means is configurable by means of the manipulation of at least the folding lines to change the spectacles from the first state to the second state and from the second state to the first state; or
wherein the at least one stabilizing means, after folding, has the shape of a double dihedral angle; or
wherein the at least one stabilizing means, after folding, has at least one concave area between the first and second folding lines; or
wherein the at least one stabilizing means forms after said folding a volume with at least one collapsible closed section in a plane, preferably in the plane of the two optical areas; or
wherein the at least one stabilizing means is configured to be able to fold the spectacles in half such that the at least two optical areas are placed against each other in a storage state; or wherein the at least one stabilizing means comprises at least one connection area wherein the rest of the spectacles are fixed.

15. The spectacles according to claim 1, wherein the material of the spectacles is a plastic sheet with optical properties suitable for each application case and a thickness of about 0.2 mm, wherein the material of the spectacles is transparent plastic, colored or not.

16. The spectacles according to claim 9, wherein the fastening means are in the form of pads.

* * * * *